(12) United States Patent
Davis (10) Patent No.: US 11,191,254 B2
(45) Date of Patent: Dec. 7, 2021

(54) ADJUSTABLE FLEXIBLE COLLAR

(71) Applicant: CENTRAL GARDEN & PET COMPANY, Walnut Creek, CA (US)

(72) Inventor: Stephen Richard Davis, Dallas, TX (US)

(73) Assignee: CENTRAL GARDEN & PET COMPANY, Walnut Creek, CA (US)

( * ) Notice: Subject to any disclaimer, the term of this patent is extended or adjusted under 35 U.S.C. 154(b) by 202 days.

(21) Appl. No.: 16/530,156

(22) Filed: Aug. 2, 2019

(65) Prior Publication Data

US 2021/0029970 A1 Feb. 4, 2021

(51) Int. Cl.
*A01K 27/00* (2006.01)

(52) U.S. Cl.
CPC .......... *A01K 27/001* (2013.01); *A01K 27/005* (2013.01)

(58) Field of Classification Search
CPC .. A01K 27/001; A01K 27/005; A01K 27/006; A01K 27/008; A01K 27/009; A01K 27/003; B65D 63/1081; B65D 2563/106; B65D 2563/107; B65D 63/1072; B65D 2563/103; B65D 2563/108; Y10T 24/45812; Y10T 24/45995; Y10T 24/141

See application file for complete search history.

(56) References Cited

U.S. PATENT DOCUMENTS

| | | |
|---|---|---|
| 370,271 A | 9/1887 | Marshburn |
| 424,197 A | 3/1890 | Harrison |
| 1,020,242 A | 3/1912 | Wilson |
| 2,389,298 A | 11/1945 | Ellis |
| 2,495,667 A | 1/1950 | Vizner |
| 2,900,696 A | 8/1959 | Bacon |
| 3,361,311 A | 1/1968 | Sartarelli |
| 3,501,814 A | 3/1970 | Anderson et al. |
| 3,994,264 A | 11/1976 | Banks |
| 4,031,589 A | 6/1977 | Stewart |
| 4,180,016 A | 12/1979 | George |
| 5,176,106 A | 1/1993 | Casto et al. |

(Continued)

FOREIGN PATENT DOCUMENTS

WO 2012/066287 5/2012

OTHER PUBLICATIONS

International Search Report and Written Opinion, dated Oct. 15, 2020, received in corresponding PCT Application No. PCT/US2020/043210.

*Primary Examiner* — Trinh T Nguyen (74) *Attorney, Agent, or Firm* — Grossman, Tucker, Perreault & Pfleger, PLLC (57) ABSTRACT

The present disclosure is directed to a flexible, adjustable, collar. The collar includes a flexible member having a first end and a second end. A plurality of surface features, each having a raised portion on the upper surface the flexible member and a corresponding recessed portion on the lower surface of the flexible member, extend from the first end along the longitudinal axis of the flexible member. An attachment channel to accommodate the passage of the first end of the flexible member is disposed proximate the second end of the flexible member. An attachment feature having a physical geometry corresponding to the recessed portion of the surface feature is disposed on the bottom portion of the attachment channel. As the first end of the flexible member is passed through the attachment channel, the attachment feature engages the recessed portion of each of the surface features.

13 Claims, 7 Drawing Sheets

FIG 1B (56) References Cited

U.S. PATENT DOCUMENTS

| | | |
|---|---|---|
| 5,197,413 A | 3/1993 | Gyr |
| 5,307,582 A | 5/1994 | Quintel |
| 5,701,849 A | 12/1997 | Suchowski et al. |
| 5,915,337 A | 6/1999 | Klinkhart et al. |
| 6,438,807 B1 | 8/2002 | Ptolemy |
| 6,606,967 B1 | 8/2003 | Wolfe, Jr. et al. |
| 6,715,449 B1 | 4/2004 | Jordan |
| D631,731 S | 2/2011 | Chen |
| 9,836,760 B2 | 5/2017 | Shepherd |
| 10,112,755 B1 | 10/2018 | Cressy |
| 10,136,617 B2 | 11/2018 | Lou |
| 10,144,566 B2 | 12/2018 | O'Reagan et al. |
| 2007/0034116 A1 | 2/2007 | Yang |
| 2007/0074678 A1 | 4/2007 | Fritschler |
| 2010/0294213 A1 | 11/2010 | Vaccari |
| 2013/0042821 A1 | 2/2013 | Roberts et al. |
| 2016/0198783 A1 | 7/2016 | Ryou |
| 2017/0135315 A1 | 5/2017 | Marmen et al. |
| 2017/0172625 A1 | 6/2017 | Hoeglund |
| 2018/0080580 A1 | 3/2018 | Coulter |
| 2018/0199548 A1 | 7/2018 | Jones |
| 2019/0009958 A1 | 1/2019 | Wiles et al. |

ADJUSTABLE FLEXIBLE COLLAR

TECHNICAL FIELD

The present disclosure relates to collars worn about the neck of an animal, such as a canine or feline collar.

BACKGROUND

Pet owners frequently desire the accompaniment of their pets outside of the home. Typically, an owner attaches a leash to a collar worn by the pet top maintain control of the pet when outside the home. Many pet owners will remove the collar from their pet inside the home and only place the collar on the pet prior to going outside with the pet. Given the tremendous physical diversity of members in the canine and feline families, collars frequently include a degree of adjustability to accommodate different sized pets.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

The apparatuses and methods disclosed herein provide a flexible, adjustable length collar for use with pets and other animals. Beneficially, the flexible, adjustable length, collar described herein provides a flexible and secure latching system that permits easy placement and removal of the collar about the neck of a pet or other animal. As disclosed herein, the collar includes a flexible member having a first end and a second end. A plurality of surface features extend from the first end of the flexible member and are spaced along a longitudinal axis of the flexible member. Each of the plurality of features includes a raised portion on an upper surface of the flexible member and a recessed portion, corresponding to the raised portion, on a lower surface of the flexible member. The second end of the flexible member includes an attachment channel that accommodates the passage of the first end of the flexible member. The attachment channel includes a bottom portion having a raised attachment feature that engages the recessed portion of each of the plurality of surface features disposed on the first end of the flexible member as the flexible member passes through the attachment channel. Upon placing the collar about the neck of a pet or other animal, the first end of the flexible member is introduced to and passed through the attachment channel until the collar is secure about the pet's neck. The attachment feature in the attachment channel engages (i.e., is at least partially inserted into) the recessed portion of one of the plurality of surface features to affix the collar about the pet's neck.

The attachment channel may include an open channel configuration or a closed channel configuration. The open attachment channel configuration includes the bottom portion containing the attachment feature, a first sidewall, and a second sidewall. The sidewalls include protrusions or similar physical barrier type devices that prevent the first end of the flexible member from "popping" or otherwise detaching from the attachment feature through the gap in the top portion of the open attachment channel. The attachment channel configuration includes the bottom portion containing the attachment feature, a first sidewall, a second sidewall, and a top portion that is physically coupled to the bottom portion via the first and the second sidewalls. The top portion of the attachment channel may include one or more apertures corresponding to the raised portion of each of the plurality of surface features.

The collar is fabricated using a flexible material that permits the temporary deformation of the attachment feature disposed on the bottom portion of the attachment channel and/or the aperture formed in the top portion of the attachment channel as the flexible member passes through the attachment channel. The collar may be fabricated using a silicone-based or elastomeric material.

Figure 1A:
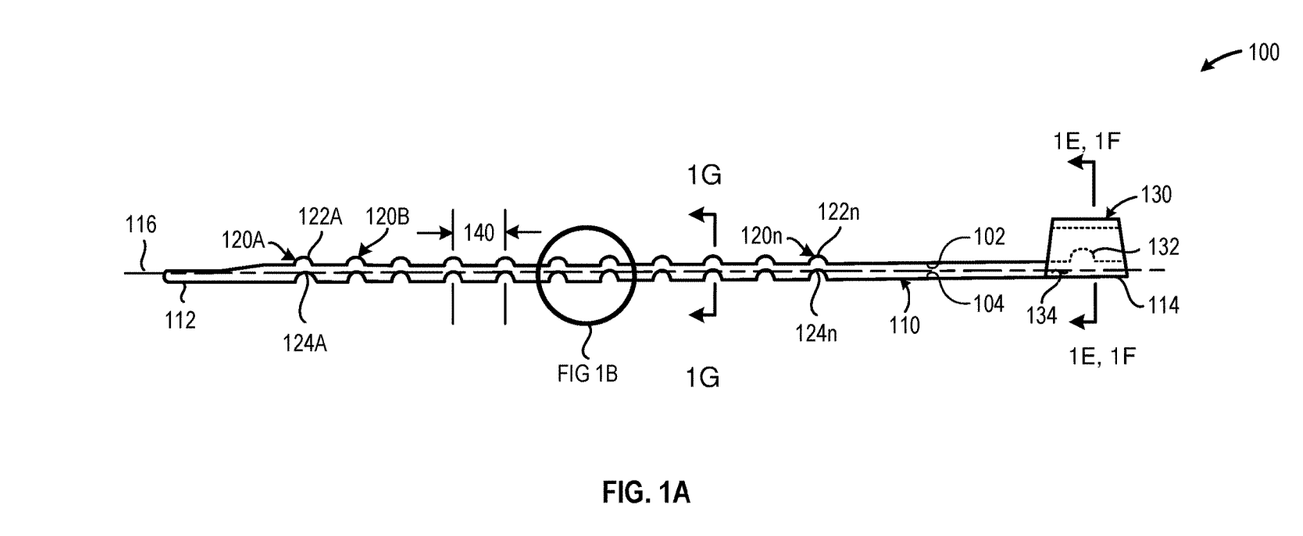
FIG. 1A is a side elevation view of an illustrative collar that includes a flexible member having a plurality of surface features spaced apart and extending from a first end of the flexible member and an attachment feature disposed proximate a second end of the flexible member, in accordance with at least one embodiment described herein.
Figure 1B:
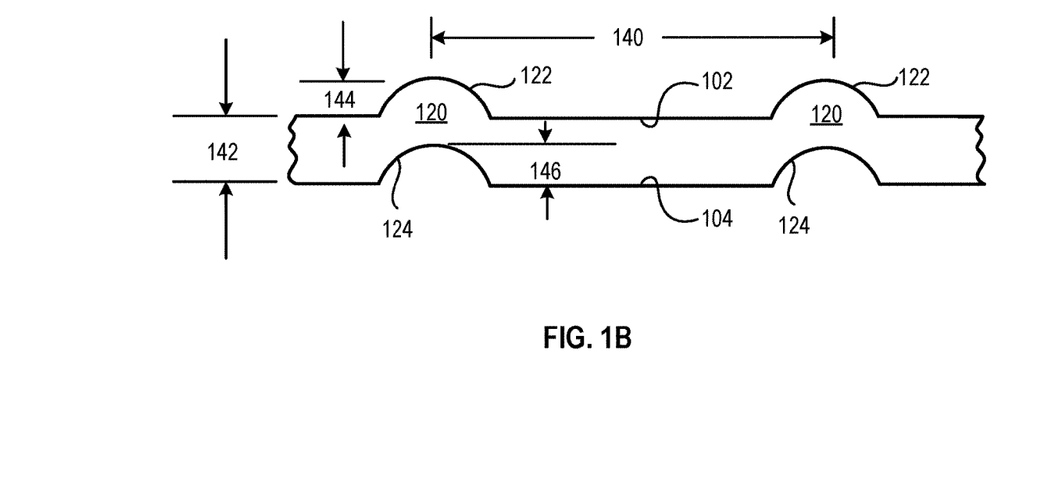
FIG. 1B is a close-up elevation depicting two surface features formed in the flexible member, in accordance with at least one embodiment described herein.
Figure 1C:
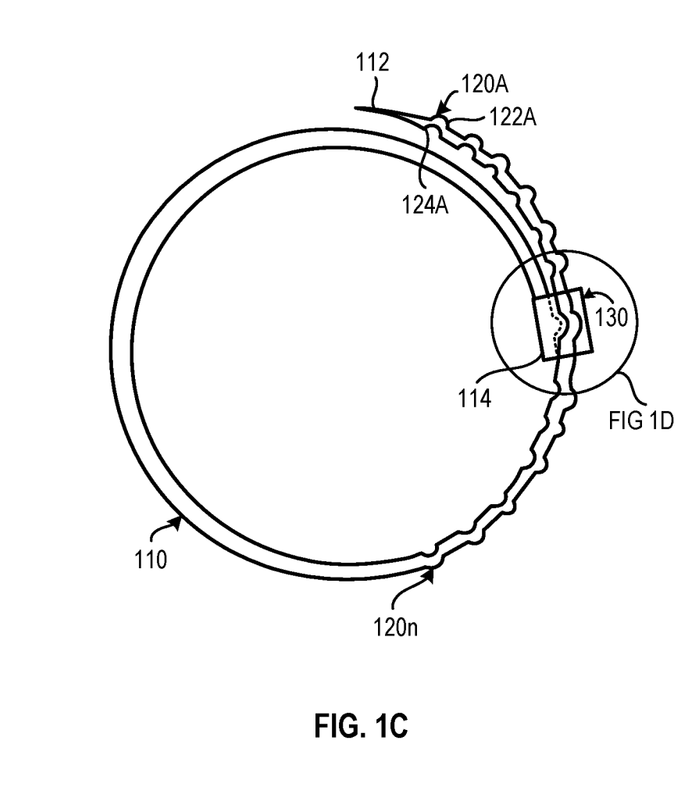
FIG. 1C is a side elevation view of the illustrative collar after passage of the first end of the flexible member through the attachment channel, in accordance with at least one embodiment described herein.
Figure 1D:
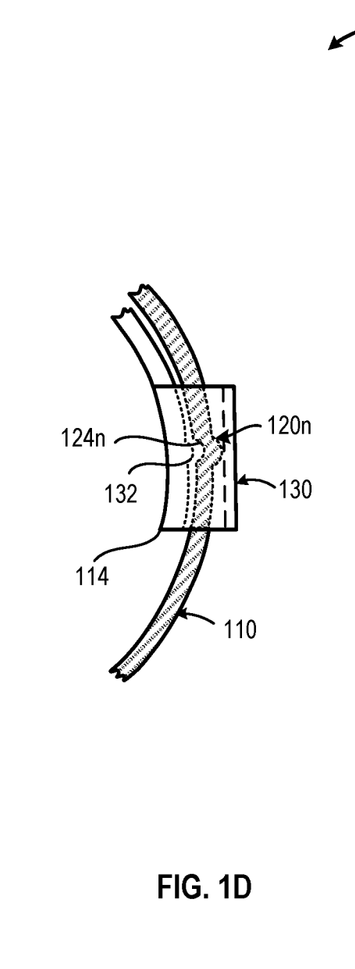
FIG. 1D is a close up side elevation of the attachment channel that more clearly shows the engagement of an attachment feature disposed on the bottom portion of the attachment channel with a recessed portion of a surface feature formed in the first end of the flexible member, in accordance with at least one embodiment described herein.
Figure 1E:
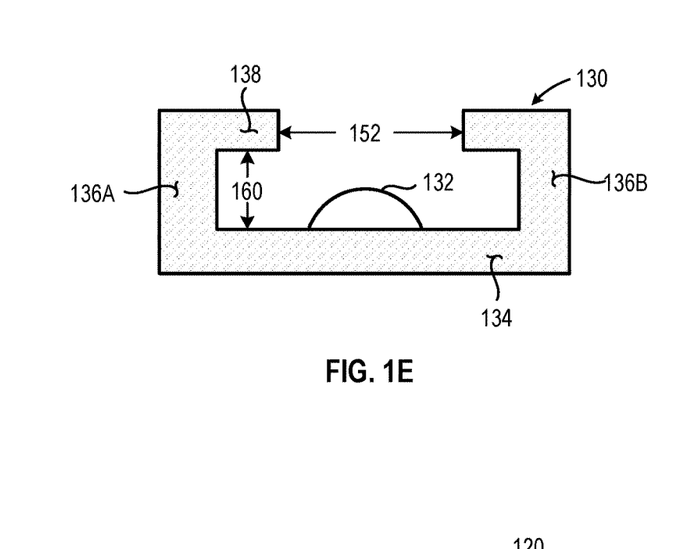
FIG. 1E is a cross-sectional elevation of an example open-top attachment channel more clearly showing the attachment feature disposed on the bottom portion of the attachment channel, in accordance with at least one embodiment described herein.
Figure 1F:
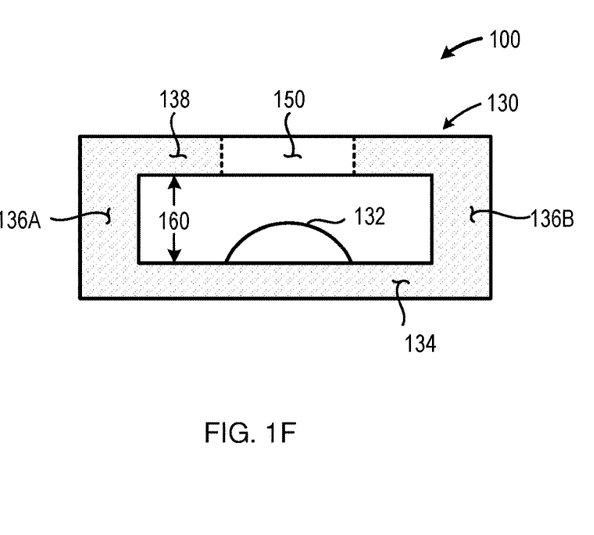
FIG. 1F is a cross-sectional elevation of an example closed-top attachment channel more clearly showing the attachment feature disposed on the bottom portion of the attachment channel, in accordance with at least one embodiment described herein.
Figure 1G:
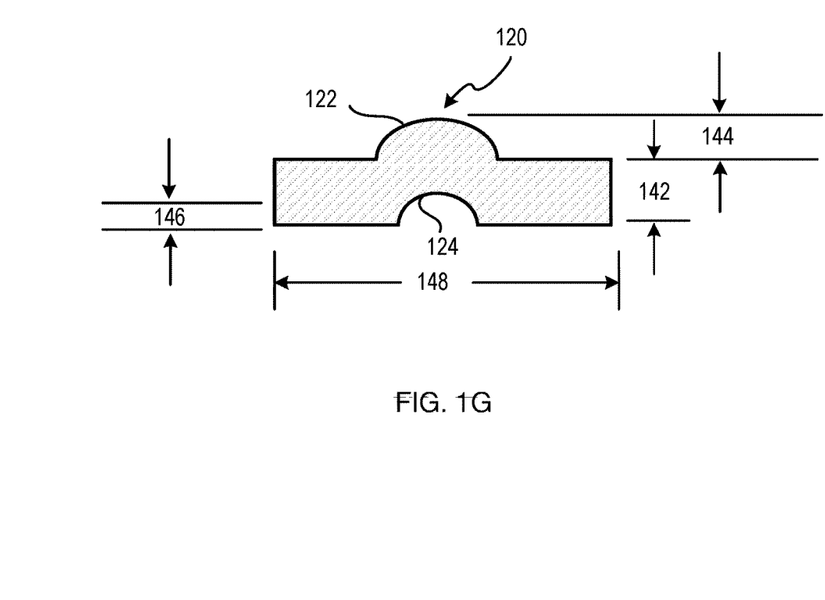
FIG. 1G is a cross-sectional elevation of an example flexible member depicting the surface feature, in accordance with at least one embodiment described herein.

FIG. 1A is a side elevation view of an illustrative collar 100 that includes a flexible member 110 having a plurality of surface features 120A-120n spaced apart and extending from a first end 112 of the flexible member 110 and an attachment feature 130 disposed proximate a second end 114 of the flexible member 110, in accordance with at least one embodiment described herein. FIG. 1B is a close-up elevation depicting two surface features 120 formed in the flexible member 110, in accordance with at least one embodiment described herein. FIG. 1C is a side elevation view of the illustrative collar 110 after passage of the first 112 end of the flexible member 110 through the attachment channel 130, in accordance with at least one embodiment described herein. FIG. 1D is a close up side elevation of the attachment channel 130 that more clearly shows the engagement of an attachment feature 132 disposed on the bottom portion 134 of the attachment channel 130 with a recessed portion 122 of a surface feature 120 formed in the first end 112 of the flexible member 110, in accordance with at least one embodiment described herein. FIG. 1E is a cross-sectional elevation of an example open-top attachment channel 130, and FIG. 1F is a cross-sectional elevation of an example closed-top attachment channel 130, more clearly showing the attachment feature 132 disposed on the bottom portion 134 of the attachment channel 130, in accordance with at least one embodiment described herein. FIG. 1G is a cross-sectional elevation of an example flexible member 110 depicting the surface feature 120, in accordance with at least one embodiment described herein.

Referring first to FIG. 1A, the collar 100 includes a flexible member 110 having a first end 112, a second end 114, an upper surface 102, and a lower surface 104. A plurality of surface features 120A-120n (collectively, "surface features 120") that extend from the first end 112 of the flexible member 110 along the longitudinal axis 116 of the flexible member 110. The collar 100 also includes an attachment channel 130 disposed proximate the second end 114 of the flexible member 110. The attachment channel 130 accepts the insertion of the first end 112 of the flexible member 110. An attachment feature 132 formed or otherwise disposed on the bottom portion 134 of the attachment channel 130 engages each of the plurality of surface features 120A-120n as the first end 112 of the flexible member is drawn through the attachment channel 130.

As used herein, the term "proximate" refers to a feature that is at or near another referenced item. For example, the attachment channel 130 is described as positioned proximate the second end 114 of the flexible member 110. Thus, the attachment channel 130 may be positioned coincident with the second end 114 of the flexible member 110 or at any location within a defined distance, e.g., 3 inches or less, of the second end 114 of the flexible member 110.

Referring next to FIGS. 1A and 1G, although depicted as rectangular in FIGS. 1A-1G, the flexible member 110 may have any cross-sectional geometry. As depicted in FIGS. 1A-1G, the flexible member 110 may have any length to provide a flexible collar 110 suitable for pets having any neck size. For example, the flexible member 110 may have a length of about: 3 inches or less; 5 inches or less; 7 inches or less; 10 inches or less; 15 inches or less; 20 inches or less; 30 inches or less; or 50 inches or less. The flexible member 110 may have any width 148. For example, the flexible member 110 may have a width 148 of about: 0.25 inches or greater; 0.375 inches or greater; 0.5 inches or greater; 0.75 inches or greater; or 1.00 inch or greater. The flexible member 110 may have any thickness 142. For example, the flexible member 110 may have a thickness 142 of about: 0.0625 inches or greater; 0.125 inches or greater; 0.25 inches or greater; or 0.375 inches or greater.

The flexible member 110 includes a plurality of surface features 120 that extend from the first end 112 of the flexible member 110 along the longitudinal axis 116 of the flexible member 110. Referring now to FIGS. 1A and 1B, each of the plurality of surface features 120 includes a raised portion 122 that projects a distance 144 above the upper surface 102 of the flexible member 110 and a recessed portion 124 that extends a distance 146 into the lower surface 104 of the flexible member 110. The surface features 120 may be spaced apart along the longitudinal axis of the flexible member by a distance 140. In embodiments, the distance 140 between neighboring surface features 120 may be similar, the same, or identical. In other embodiments, the distance 140 between neighboring surface features 120 may be different.

The flexible member 110 may be fabricated using any flexible material. Non-limiting examples of such flexible materials include: natural or synthetic fabrics, polymeric materials, elastomeric materials, or combinations thereof. In embodiments, the flexible member 110 may include one or more decorative fragrances. In embodiments, the flexible member 110 may include one or more therapeutic materials, such as a flea and tick repellant or insecticide. The flexible member 110 includes a plurality of surface features 120 that may be integrally formed, stamped, embossed, or otherwise disposed in the flexible member such that each of the surface features 120A-120n includes a respective convex, or raised, portion 122A-122n that projects a distance 144 from the upper surface 102 of the flexible member 110 and a respective concave, or recessed, portion 124A-124n that is recessed a distance 146 into the lower surface 104 of the flexible member 110.

Although depicted as hemispherical in FIGS. 1A-1G, the surface features 120 may have any physical geometry including but not limited to: hemispherical, polygonal, trapezoidal, rectangular, frustoconical, and similar. Each of the surface features 120 may have a longitudinal dimension measured along the longitudinal axis 116 of the flexible member 110 and a lateral dimension measured along a lateral axis that is orthogonal to the longitudinal axis 116 of the flexible member 110. Thus, for a hemispherical surface feature 120, the longitudinal dimension and the lateral dimension are equal and for a generally rectangular surface feature disposed transverse to the longitudinal axis 116, the lateral dimension will exceed the longitudinal dimension. In embodiments, each of the surface features 120 may have a lateral dimension that is a percentage of the width 148 of the flexible member 110. For example, each of the surface features 120 may have a lateral dimension of about: 20% or less; 30% or less; 40% or less; 50% or less; 60% or less; 70% or less; or 80% or less of the width 148 of the flexible member 110.

In embodiments, each of the surface features 120 project a similar distance or height 144 above the upper surface 102 of the flexible member 110. In embodiments, each of the surface features 120 project two or more different distances or heights 144 above the upper surface 102 of the flexible member 110. Each of the surface features 120 may project a distance 144 above the upper surface 102 of the flexible member 110 that is a percentage of the thickness 142 of the flexible member 110. Each of the surface features 120 may project a distance or height 144 of about: 10% or greater; 20% or greater; 30% or greater; 40% or greater; 50% or greater; 60% or greater; or 70% or greater of the thickness 142 of the flexible member. For example, for a 0.25 inch thick flexible member 110 with 50% projection surface features 120, each of the plurality of surface features 120 may project a distance 144 of about 0.25×50%, or about 0.125 inches above the upper surface 102 of the flexible member 110.

In embodiments, each of the surface features 120 may be recessed a similar distance 146 from the lower surface 104 of the flexible member 110. In embodiments, each of the surface features 120 may be recessed two or more distances 146 from the lower surface 104 of the flexible member 110. Each of the surface features 120 may be recessed a distance 146 from the lower surface 104 of the flexible member 110 that is a percentage of the thickness 142 of the flexible member 110. Each of the surface features 120 may be recessed a distance 146 of about: 10% or greater; 20% or greater; 30% or greater; 40% or greater; 50% or greater; 60% or greater; or 70% or greater of the thickness 142 of the flexible member. For example, for a 0.25 inch thick flexible member 110 with 50% recessed surface features 120, each of the plurality of surface features 120 may be recessed a distance 146 of about 0.25×50%, or about 0.125 inches above the upper surface 102 of the flexible member 110.

Each of the plurality of surface features $120_x$ is physically separated or isolated from one or more neighboring surface features $120_{x-1}$ and/or $120_{x+1}$ separated by a distance 140. In embodiments, the distance 140 may be fixed such that the plurality of surface features 120 are evenly spaced as they extend from the first end 112 of the flexible member 110. In embodiments, the distance 140 may be variable such that the plurality of surface features 120 are unevenly spaced as they extend from the first end 112 of the flexible member 110. In embodiments, the separation distance 140 between neighboring surface features 110 may be a multiple of the longitudinal dimension of the surface feature. In embodiments, the separation distance 140 between surface features 120 may be about: 1.1 times or greater; 1.25 times or greater; 1.5 times or greater; 1.75 times or greater; or 2 times or greater than the longitudinal dimension of the surface feature 120.

Referring next to FIGS. 1A, 1C, 1D, 1E, and 1F, the attachment channel 130 disposed on the second end 114 of the flexible member 110 accommodates the slideable insertion of the first end 112 of the flexible member 110. One or more attachment features 132 are disposed proximate the bottom portion 134 of the attachment channel 130. The one or more attachment features 132 have a physical geometry that corresponds to the recessed portion 124 of each of the surface features 120. The attachment feature 132 engages the recessed portion 124 of each of the surface features 120 as the flexible member 110 passes through the attachment channel 130. As depicted in FIGS. 1C and 1D, the attachment feature 132 at least partially fills the recessed portion 124 of each surface feature 120 as the flexible member 110 passes through the attachment channel 130. In embodiments, the depth 160 of the attachment channel 130 may be a multiple of the thickness 142 of the flexible member 110. In embodiments, the depth 160 of the attachment channel 130 may be about 105% or more; 110% or more; 120% or more; 150% or more; or about 200% or more of the thickness 142 of the flexible member 110.

The attachment feature 132 has a physical geometry similar or identical to the physical geometry of the recessed portion 124 of the surface features 120 formed in the flexible member. As the first end 112 of the flexible member 110 is drawn through the attachment channel 130, the recessed portion 124 of each of at least some of the surface features 120 engage the attachment feature 132. All or a portion of the attachment feature 132 fits within the recessed portion 124 of each of some or all of the surface features 120. In embodiments, the volume of the attachment feature 132 is less than the volume of the recessed portion 124 of each of the surface features 120. For example, the volume of the attachment feature 132 may be about: 99% or less; 95% or less; 90% or less; 80% or less; 70% or less; 60% or less; 50% or less; 40% or less; 30% or less; or 25% or less than the volume of the recessed portion 124 of the surface features 120. Dimensionally, the attachment feature 132 is smaller than the inside dimensions of the recessed portion 124 of the surface feature 120. For example, the dimensions of the attachment feature 132 may be about: 99% or less; 95% or less; 90% or less; 80% or less; 70% or less; 60% or less; 50% or less; 40% or less; 30% or less; or 25% or less than the corresponding dimensions of the recessed portion 124 of the surface features 120.

Referring first to FIG. 1E, in embodiments, the attachment channel 130 includes a bottom portion 134, a top portion 138, a first sidewall portion 136A physically coupling the bottom portion 134 to the top portion 138, and a second sidewall portion 136B physically coupling the bottom portion 134 to the top portion 138. In such embodiments, the top portion 138 of the attachment channel 130 includes a longitudinal slot 152. The attachment feature 132 may be centered beneath the longitudinal slot 152 or may be laterally offset with respect to the longitudinal slot 152. The longitudinal slot 152 allows passage of the raised portion 122 each of the surface features 120 to pass through the attachment channel 130. In embodiments, the slot 152 may have a lateral width that is less than the lateral width of the surface features 120. In other embodiments, the slot 152 may have a lateral width that is greater than the lateral width of the surface features 120. In such embodiments, the attachment feature 132 engages the recessed portion 124 of each of the surface features 120 as the flexible member 110 is passed longitudinally through the attachment channel 130.

Referring next to FIG. 1F, in embodiments, the attachment channel 130 includes a bottom portion 134, a top portion 138, a first sidewall portion 136A physically coupling the bottom portion 134 to the top portion 138, and a second sidewall portion 136B physically coupling the bottom portion 134 to the top portion 138. In such embodiments, the top portion 138 of the attachment channel 130 includes an aperture 150. The aperture 150 may be positioned above the attachment feature 132 or may be laterally and/or longitudinally offset from the attachment feature 132. In such embodiments, the aperture 150 engages the raised portion 122 of each of the surface features 120 and the attachment feature 132 engages the recessed portion 124 of each of the surface features 120 as the flexible member 110 is passed longitudinally through the attachment channel 130. In embodiments, the aperture 150 may be understood as an opening in the top portion 138 that is fully defined by wall sections in the top portion 138.

The aperture 150 has a physical geometry similar or identical to the physical geometry of the raised portion 122 of the surface features 120 formed in the flexible member 110. As the first end 112 of the flexible member 110 is drawn through the attachment channel 130, the raised portion 122 of each of at least some of the surface features 120 engage the aperture 150. All or a portion of raised portion 122 of each surface feature 120 fits within the aperture 150. Dimensionally, the aperture 150 includes one or more dimensions that are greater than one or more external dimensions of the raised portion 122 proximate the aperture 150. For example, the one or more dimensions of the aperture 150 may be greater than 100% of the one or more dimensions of the raised portion 122 of the surface feature 120 proximate the perimeter of the aperture 150.

The attachment channel 130 may include the same or different materials of construction as the flexible member 110. In embodiments, the attachment channel 130 may be formed integrally with the flexible member 110. In other embodiments, the attachment channel 130 may be formed separate from the flexible member 110 and affixed to the flexible member 110 for example by thermal bonding, chemical bonding, press-fitting, physical fasteners, or combinations thereof. In embodiments, the attachment channel 130 may be formed using a material having a durometer similar to the durometer of the material used to form the flexible member 110. In other embodiments, all or a portion of the attachment channel 130 may be formed using a material having a higher durometer than the durometer of the material used to form the flexible member 110.

Figure 2A:
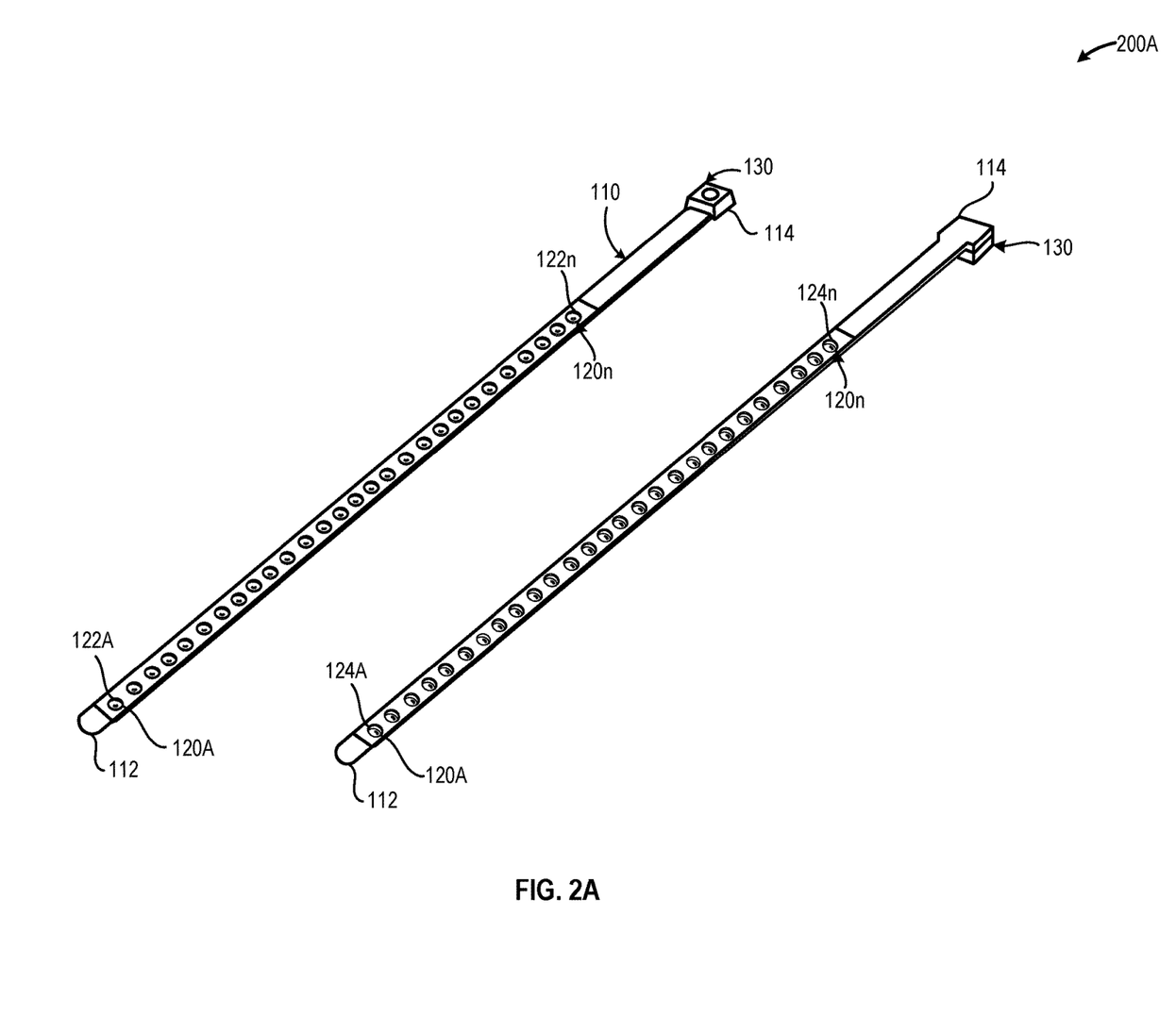
FIG. 2A is an upper perspective view and a lower perspective view of an illustrative collar that includes a plurality of surface features having a hemispherical physical geometry, in accordance with at least one embodiment described herein.
Figure 2B:
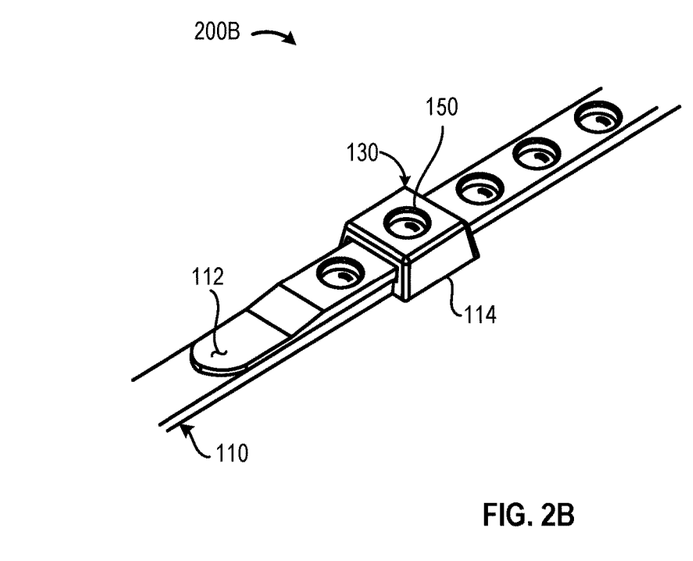
FIG. 2B is a close-up perspective view of the attachment channel of the illustrative collar after the first end of the flexible member has passed through the attachment channel and the surface feature has engaged the attachment feature disposed in the attachment channel, in accordance with at least one embodiment described herein.
Figure 2C:
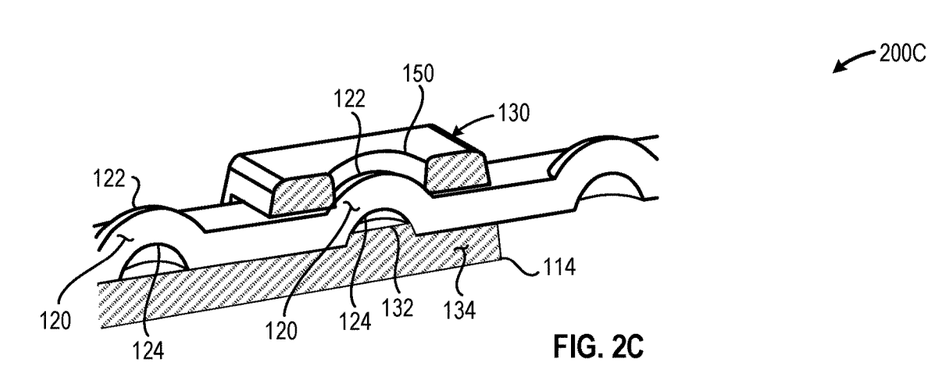
FIG. 2C is a sectional perspective of the attachment channel of the illustrative collar after the first end of the flexible member has passed through the attachment channel and the surface feature has engaged the attachment feature disposed in the attachment channel, in accordance with at least one embodiment described herein.
Figure 2D:
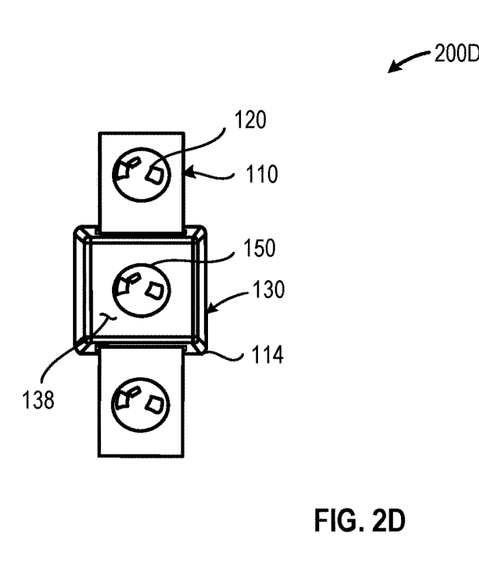
FIG. 2D is a plan view of the attachment channel of the illustrative collar after the first end of the flexible member has passed through the attachment channel and the surface feature has engaged the attachment feature disposed in the attachment channel, in accordance with at least one embodiment described herein.

FIG. 2A is an upper perspective view and a lower perspective view of an illustrative collar 200 that includes a plurality of surface features 120A-120n having a hemispherical physical geometry, in accordance with at least one embodiment described herein. FIG. 2B is a close-up perspective view of the attachment channel 130 of the illustrative collar 200 after the first end 112 of the flexible member 110 has passed through the attachment channel 130 and the surface feature 120 has engaged the attachment feature 132 disposed in the attachment channel 130, in accordance with at least one embodiment described herein. FIG. 2C is a sectional perspective of the attachment channel 130 of the illustrative collar 200 after the first end 112 of the flexible member 110 has passed through the attachment channel 130 and the surface feature 120 has engaged the attachment feature 132 disposed in the attachment channel 130, in accordance with at least one embodiment described herein. FIG. 2D is a plan view of the attachment channel 130 of the illustrative collar 200 after the first end 112 of the flexible member 110 has passed through the attachment channel 130 and the surface feature 120 has engaged the attachment feature 132 disposed in the attachment channel 130, in accordance with at least one embodiment described herein.

As depicted in FIGS. 2A-2D, the first end 112 of the flexible member 110 passes through the attachment channel 130. As the flexible member 110 passes through the attachment channel 130, the attachment feature 132 disposed on the bottom portion 134 of the attachment channel 130 engages the recessed portion 124 of each surface feature 120. As depicted in FIGS. 2A-2D, the attachment channel 130 may beneficially immobilize and lock the flexible member 112 into position by engaging both the raised portion 122 of a surface feature 120 and the recessed portion 124 of each surface feature 120. In embodiments, the flexible member 110 may be released from the attachment channel 130 by applying a downward force on (i.e., pressing) the raised portion 122 of the surface feature 120 trapped in the attachment channel 130. The downward force causes a deformation of the surface feature 120 sufficient to disengage the recessed portion 124 of the surface feature 120 from the attachment feature 132 thereby releasing the flexible member 110 from the attachment channel 130.

Figure 3A:
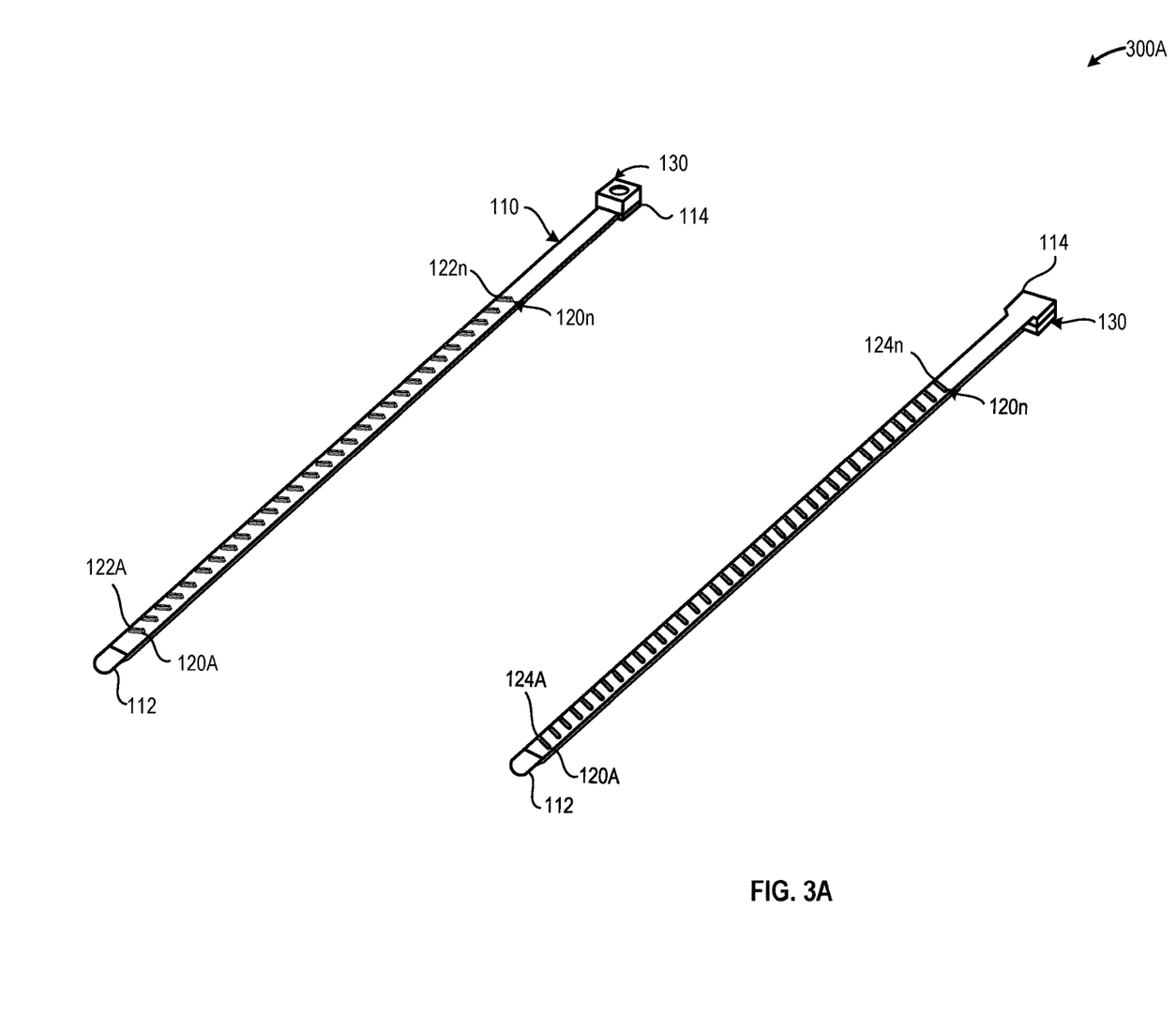
FIG. 3A is an upper perspective view and a lower perspective view of an illustrative collar that includes a plurality of surface features having a rectangular physical geometry, in accordance with at least one embodiment described herein.
Figure 3B:
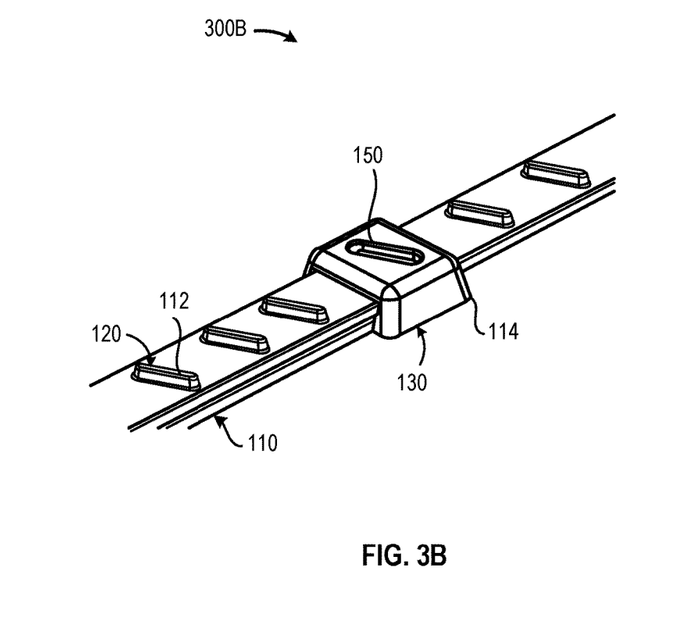
FIG. 3B is a close-up perspective view of the attachment channel of the illustrative collar after the first end of the flexible member has passed through the attachment channel and the surface feature has engaged the attachment feature disposed in the attachment channel, in accordance with at least one embodiment described herein.
Figure 3C:
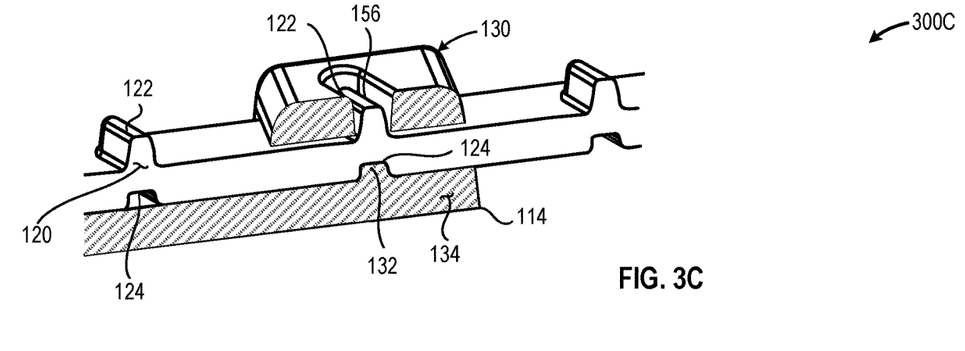
FIG. 3C is a sectional perspective of the attachment channel of the illustrative collar after the first end of the flexible member has passed through the attachment channel and the surface feature has engaged the attachment feature disposed in the attachment channel, in accordance with at least one embodiment described herein.
Figure 3D:
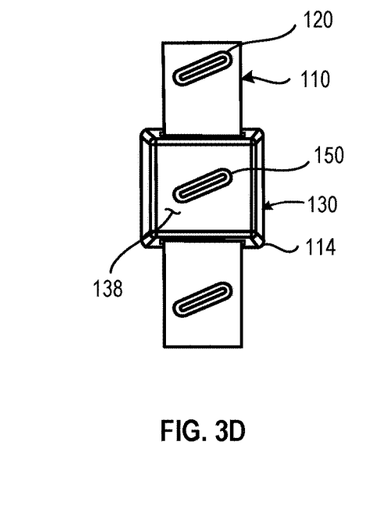
FIG. 3D is a plan view of the attachment channel of the illustrative collar after the first end of the flexible member has passed through the attachment channel and the surface feature has engaged the attachment feature disposed in the attachment channel, in accordance with at least one embodiment described herein.

FIG. 3A is an upper perspective view and a lower perspective view of an illustrative collar 300 that includes a plurality of surface features 120A-120n having a rectangular physical geometry, in accordance with at least one embodiment described herein. FIG. 3B is a close-up perspective view of the attachment channel 130 of the illustrative collar 300 after the first end 112 of the flexible member 110 has passed through the attachment channel 130 and the surface feature 120 has engaged the attachment feature 132 disposed in the attachment channel 130, in accordance with at least one embodiment described herein. FIG. 3C is a sectional perspective of the attachment channel 130 of the illustrative collar 300 after the first end 112 of the flexible member 110 has passed through the attachment channel 130 and the surface feature 120 has engaged the attachment feature 132 disposed in the attachment channel 130, in accordance with at least one embodiment described herein. FIG. 3D is a plan view of the attachment channel 130 of the illustrative collar 300 after the first end 112 of the flexible member 110 has passed through the attachment channel 130 and the surface feature 120 has engaged the attachment feature 132 disposed in the attachment channel 130, in accordance with at least one embodiment described herein.

As depicted in FIGS. 3A-3D, the first end 112 of the flexible member 110 passes through the attachment channel 130. As the flexible member 110 passes through the attachment channel 130, the attachment feature 132 disposed on the bottom portion 134 of the attachment channel 130 engages the recessed portion 124 of each surface feature 120. As depicted in FIGS. 3A-3D, the attachment channel 130 may beneficially immobilize and lock the flexible member 112 into position by engaging both the raised portion 122 of a surface feature 120 and the recessed portion 124 of each surface feature 120. In embodiments, the flexible member 110 may be released from the attachment channel 130 by applying a downward force on (i.e., pressing) the raised portion 122 of the surface feature 120 trapped in the attachment channel 130. The downward force causes a deformation of the surface feature 120 sufficient to disengage the recessed portion 124 of the surface feature 120 from the attachment feature 132 thereby releasing the flexible member 110 from the attachment channel 130.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. An adjustable collar, comprising:
a flexible member having a first end, a second end, an upper surface, a lower surface transversely opposed to the upper surface across a flexible member thickness, a longitudinal axis, and a width measured orthogonally to the longitudinal axis, the flexible member including;
a plurality of surface features disposed in locations spaced along the longitudinal axis of the flexible member;
wherein each of the plurality of surface features includes a recessed portion formed in the lower surface of the flexible member and a raised portion formed in the upper surface of the flexible member, wherein the recessed portion extends a distance into the lower surface of the flexible member and wherein the raised portion projects a distance above the upper surface of the flexible member; and
an attachment channel disposed proximate the second end of the flexible member, the attachment channel to accommodate the passage of the first end of the flexible member, the attachment channel including:
a top portion; and
a bottom portion that includes a raised attachment feature to engage the recessed portion of each of the plurality of surface features disposed along the longitudinal axis of the flexible member.

2. The adjustable collar of claim 1:
wherein the raised portion of each of the plurality of surface features includes a surface feature height; and
wherein the surface feature height is 70% or less of the flexible member thickness.

3. The adjustable collar of claim 1:
wherein the recessed portion of each of the plurality of surface features includes a surface feature depth; and
wherein the surface feature depth is 70% or less of the flexible member thickness.

4. The adjustable collar of claim 1:
wherein each of the plurality of surface features includes a feature width measured orthogonal to the longitudinal axis of the flexible member; and
wherein the surface feature width is 70% or less of the width of the flexible member.

5. The adjustable collar of claim 1:
wherein the recessed portion formed in the lower surface of the flexible member comprises a recessed portion having a physical geometry; and
wherein the physical geometry of the recessed portion accommodates the raised attachment feature disposed on the bottom portion of the attachment channel.

6. The adjustable collar of claim 1 wherein each of the plurality of surface features includes at least one of: a hemispherical surface feature, an ovoid surface feature, a polygonal surface feature, a conical frustum surface feature, or a rounded-corner polygonal surface feature.

7. The adjustable collar of claim 1 wherein the flexible member comprises a flexible polymer material.

8. The adjustable collar of claim 1 wherein the flexible member comprises an elastomeric material.

9. The adjustable collar of claim 1 wherein the flexible member and at least a portion of the attachment channel are integrally formed.

10. The adjustable collar of claim 1 wherein the top portion of the attachment channel includes a longitudinal slot to accommodate the passage of the raised portion of each of the plurality of surface features disposed along the longitudinal axis of the flexible member.

11. The adjustable collar of claim 1 wherein the top portion of the attachment channel includes an aperture to engage the raised portion of each of the plurality of surface features disposed along the longitudinal axis of the flexible member.

12. The adjustable collar of claim 1 wherein the recessed portion underlies the raised portion.

13. The adjustable collar of claim 1 wherein the top portion of the attachment channel includes an aperture to engage the raised portion of each of the plurality of surface features disposed along the longitudinal axis of the flexible member; and
wherein the collar is arranged such that the raised portion formed in the upper surface of the flexible member engages with the aperture of the top portion of the attachment channel while, at a same time, the raised attachment feature of the bottom portion of the attachment channel engages with the recessed portion formed in the lower surface of the flexible member.

* * * * *